M. B. HENRY.
Lifting Jacks.
No. 151,126.  Patented May 19, 1874.
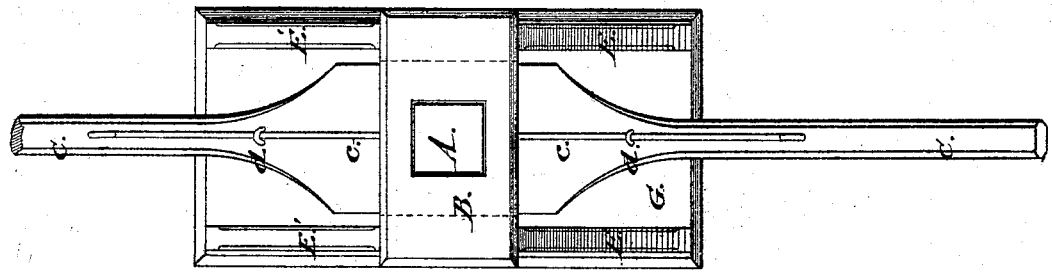
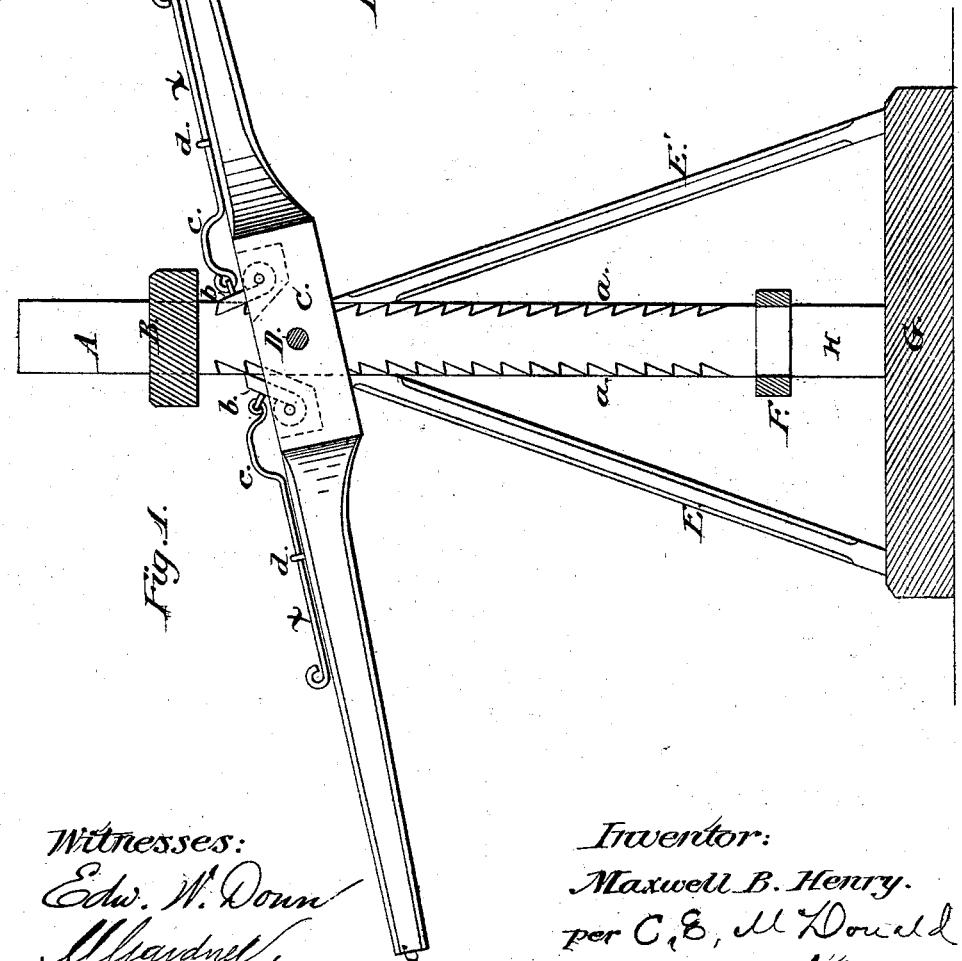
Witnesses:
Edw. W. Down
M. Gardner
Inventor:
Maxwell B. Henry.
per C. S. McDonald
Atty.

UNITED STATES PATENT OFFICE.

MAXWELL B. HENRY, OF EAST ST. LOUIS, ILLINOIS.

IMPROVEMENT IN LIFTING-JACKS.

Specification forming part of Letters Patent No. 151,126, dated May 19, 1874; application filed December 12, 1873.

*To all whom it may concern:*

Be it known that I, MAXWELL B. HENRY, of East St. Louis, county of St. Clair, State of Illinois, have invented an Improvement in Lifting-Jacks, of which the following is a specification:

My invention is an improvement in the class of lifting-jacks formed chiefly of a ratchet-bar, operated vertically in a suitable guide by means of a pivoted frame, and a lever having spring-pawls connected thereto. The invention consists in the construction and arrangement of the spring-pawls with the operating-lever and ratchet or lifting bar, as hereinafter described.

Figure 1 is a sectional side elevation, and Fig. 2 a top-plan view, of the apparatus.

Two vertical parallel standards, H, having braces E E', are fixed in the enlarged base or platform G, and connected by a cross-piece, B, at the top. These parts form the immovable frame of the apparatus. The movable parts are the hand-lever C, hinged pawls $b$, operated by rods $c$, and the double ratchet-bar A. The said bar has a base guide-block, F, which is notched or so constructed as to embrace the standards H and slide therein as the bar A is moved up or down. Said bar also passes through an enlarged slot in the lever C, and a slot in the cross-bar B. The bar is thus guided and steadied in its vertical movement by the block F and bar B. The bar C has a short journal on each side, whose bearing is in the adjacent standard H. The pawls $b$ are held engaged with the notches or teeth $a$ of the bar A by means of the curved spring ends $c$ of the rods $x$, which latter are held by friction, but may yet be slid in staples $d$, fixed in the lever C, as shown.

To elevate the bar A, and thereby also the object with which its upper end may be placed in contact, it is only necessary to alternately raise or depress either end of the lever C. When it is desired to lower the bar it may be readily done by manipulating the pawls $b$ through the medium of the spring-rods $c\ x$, as will be understood without special description.

I do not claim the combination of a ratchet-bar, pivoted pawls, and a hand-lever; but

I claim—

The combination of the rods $x$, having curved spring ends $c$, the pawls $b$, lever C, staples $d$, ratchet-bar A, and guide-frame, as shown and described, to operate as specified.

In testimony that I claim the foregoing specification I have hereunto set my hand this 7th day of October, 1873.

MAXWELL B. HENRY.

Attest:
 FRED. WERBE,
 F. M. MCDONALD.